(12) United States Patent
Li et al.

(10) Patent No.: US 9,210,226 B2
(45) Date of Patent: Dec. 8, 2015

(54) METHOD AND DEVICE FOR LOCATION MANAGEMENT OF GROUP-BASED MACHINE TYPE COMMUNICATION MTC DEVICE

(71) Applicant: Huawei Device Co., LTD, Shenzhen (CN)

(72) Inventors: Xiaojuan Li, Beijing (CN); Shuiping Long, Beijing (CN); Hui Jin, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 391 days.

(21) Appl. No.: 13/946,877

(22) Filed: Jul. 19, 2013

(65) Prior Publication Data

US 2013/0304857 A1 Nov. 14, 2013

Related U.S. Application Data

(63) Continuation of application No. PCT/CN2012/070515, filed on Jan. 18, 2012.

(30) Foreign Application Priority Data

Jan. 20, 2011 (CN) .......................... 2011 1 0023390

(51) Int. Cl.
*G06F 15/16* (2006.01)
*G06F 15/173* (2006.01)
(Continued)

(52) U.S. Cl.
CPC ............... *H04L 67/18* (2013.01); *H04W 4/005* (2013.01); *H04W 4/08* (2013.01); *H04W 8/186* (2013.01); *H04W 60/00* (2013.01)

(58) Field of Classification Search
USPC .................. 709/203, 217, 223; 370/313, 328; 455/416, 433, 436
See application file for complete search history.

(56) References Cited

U.S. PATENT DOCUMENTS 6,097,942 A * 8/2000 Laiho ...................... H04W 4/08 455/416
8,140,077 B2 * 3/2012 Saifullah ............... H04W 36/38 455/436

(Continued)

FOREIGN PATENT DOCUMENTS

CN 1279863 A 9/1998
CN 101860807 A 10/2010
(Continued)

OTHER PUBLICATIONS

Written Opinion of the International Searching Authority received in Application No. PCT/CN2012/070515 mailed May 3, 2012, 13 pages.
(Continued)

*Primary Examiner* — Quang N Nguyen
(74) *Attorney, Agent, or Firm* — Slater & Matsil, L.L.P.

(57) ABSTRACT

Embodiments of the present invention provide a method and a device for location management of a group-based machine type communication MTC device. The method includes: receiving a location update message sent by a mobility management network element, where the location update message includes a device identity and/or a group identity of a first MTC device; acquiring the group identity of the first MTC device according to the location update message, and updating subscription data of all MTC devices in a group corresponding to the group identity; and sending subscription data of the group to the mobility management network element, where the group subscription data includes the group identity and/or a device identity list of all the MTC devices in the group. An embodiment of the present invention further provides a corresponding device.

14 Claims, 8 Drawing Sheets

(51) Int. Cl.
*H04L 29/08* (2006.01)
*H04W 8/18* (2009.01)
*H04W 4/00* (2009.01)
*H04W 4/08* (2009.01)
*H04W 60/00* (2009.01)

(56) References Cited

U.S. PATENT DOCUMENTS 9,019,887 B2 * 4/2015 Lim .................. H04W 4/08 370/313
2010/0285816 A1 11/2010 Vos et al.
2013/0021970 A1 * 1/2013 Lei .................. H04W 4/005 370/328
2015/0208322 A1 * 7/2015 Lim .................. H04W 4/08 455/433

FOREIGN PATENT DOCUMENTS

CN 101895858 A 11/2010
CN 101938705 A 1/2011

OTHER PUBLICATIONS

International Search Report for Application No. PCT/CN2012/070515, mailed May 3, 2012, 4 pages.

* cited by examiner

METHOD AND DEVICE FOR LOCATION MANAGEMENT OF GROUP-BASED MACHINE TYPE COMMUNICATION MTC DEVICE

This application is a continuation of International Application No. PCT/CN2012/070515, filed on Jan. 18, 2012, which claims priority to Chinese Patent Application No. 201110023390.0, filed on Jan. 20, 2011, both of which are hereby incorporated by reference in their entireties.

TECHNICAL FIELD

The present invention relates to the field of communications technologies, and in particular, to a method and a device for location update of a group-based machine type communication (MTC) device.

BACKGROUND

A machine-to-machine communication (machine-to-machine; M2M) technology is an integrated communication and network technology, which is a technology for connecting machine devices spreading all over daily lives of people into a network, so that these devices become more "intelligent". The M2M technology has features such as no wiring and wide coverage. The M2M technology relates to a large number of terminals, puts forward high requirements on the management capability of the network side, and increases the transmission load between the network and the terminals. Therefore, in order to be capable of optimizing the management capability of the network side, and optimizing signaling or data transmission between the network and the terminals, the terminals in M2M perform grouping according to different dimensions, for example, different area information, different applications, or different machine type communications (Machine Type Communications; MTC) owners. For example, multiple MTC devices on an automobile may be classified as a group of terminal devices in the M2M generally, and these terminal devices usually jointly move.

When a group of devices in a same location in the existing M2M perform location update, it is required that each device in the group initiates a location update request to the network separately, and the network performs location update on each device separately. At the same time, if one device in the group sends an alarm request to the network, or the network monitors that an anomaly occurs in one device in the group, the network only processes the device, and does not perform corresponding processing on one or more other devices in the group. In the prior art, network resources are wasted, much signaling is transmitted between the network and the device, and the efficiency of the network control over the group of devices is low.

SUMMARY OF THE INVENTION

Embodiments of the present invention provide a method and a device for location management of a group-based machine type communication MTC device, so as to solve problems that network resources are wasted, much signaling is transmitted between the network and the device, and the efficiency of the network control over the group of devices is low in the prior art.

In one aspect, an embodiment of the present invention provides a method for location management of a group-based machine type communication MTC device, which includes receiving a location update message sent by a mobility management network element, where the location update message carries a device identity and/or a group identity of a first MTC device, acquiring the group identity of the first MTC device according to the location update message, and updating subscription data of all MTC devices in a group corresponding to the group identity, and sending subscription data of the group to the mobility management network element, where the group subscription data includes the group identity and/or a device identity list of all the MTC devices in the group.

An embodiment of the present invention further provides a method for location management of a group-based machine type communication MTC device, which includes receiving a location management request initiated by a first MTC device, where the location management request includes a device identity and/or a group identity of the first MTC device, sending a location update message to a home subscriber register, where the location update message includes the device identity and/or the group identity of the first MTC device, and receiving group subscription data, of a group to which the first MTC device belongs, returned by the home subscriber register, where the group subscription data is group subscription data after the home subscriber register updates subscription data of all devices in a group corresponding to the group identity of the first MTC device, and the group subscription data includes the group identity and/or a device identity list of all the devices in the group.

In another aspect, an embodiment of the present invention further provides a home subscriber register, which includes a receiving module, configured to receive a location update message sent by a mobility management network element, where the location update message includes a device identity and/or a group identity of a first MTC device, an update module, configured to acquire the group identity of the first MTC device according to the location update message, and update subscription data of all MTC devices in a group corresponding to the group identity, and a sending module, configured to send subscription data of the group to the mobility management network element, where the group subscription data includes the group identity and/or a device identity list of all the MTC devices in the group.

An embodiment of the present invention further provides a mobility management network element, which includes a first receiving module, configured to receive a location management request initiated by a first MTC device, where the location management request includes a device identity and/or a group identity of the first MTC device, a sending module, configured to send a location update message to a home subscriber register, where the location update message includes the device identity and/or the group identity of the first MTC device, and a second receiving module, configured to receive group subscription data, of a group to which the first MTC device belongs, returned by the home subscriber register, where the group subscription data is group subscription data after the home subscriber register updates subscription data of all devices in a group corresponding to the group identity of the first MTC device, and the group subscription data includes the group identity and/or a device identity list of all the devices in the group.

In the method and the device for location management of a group-based MTC device provided by the embodiments of the present invention, the mobility management network element receives the location management request initiated by one MTC device in the group, and initiates the location update request to the home subscriber register, and the home subscriber register updates subscription data of all the MTC devices in the group according to the group identity of the group to which the MTC device belongs, thereby saving network resources, reducing signaling transmission between the network and the device, and improving the efficiency of the network control over the group of devices.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are only a part rather than all of the embodiments of the present invention of the invention. All other embodiments, which can be derived by persons of ordinary skill in the art from the embodiments of the present invention without creative efforts, shall fall within the protection scope of the present invention.

Figure 1:
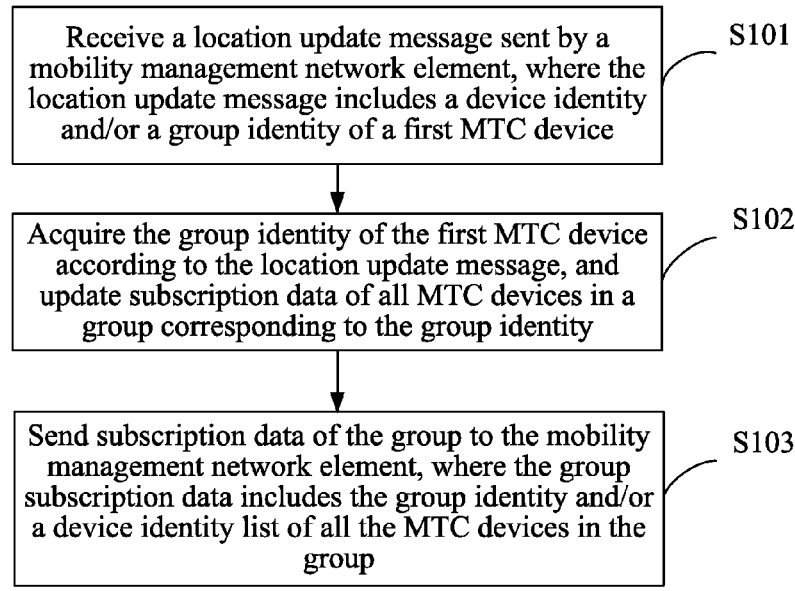
FIG. 1 is a flow chart of a first embodiment of a method for location management of a group-based MTC device provided by the present invention.

FIG. 1 is a flow chart of a first embodiment of a method for location management of a group-based MTC device provided by the present invention, and as shown in FIG. 1, the method includes the following steps:

S101: Receive a location update message sent by a mobility management network element, where the location update message includes a device identity and/or a group identity of a first MTC device.

S102: Acquire the group identity of the first MTC device according to the location update message, and update subscription data of all MTC devices in a group corresponding to the group identity.

S103: Send subscription data of the group to the mobility management network element, where the group subscription data includes the group identity and/or a device identity list of all the MTC devices in the group.

The embodiment of the present invention is applicable to multiple networks such as a universal mobile telecommunications system (Universal Mobile Telecommunications System; UMTS) network, an E-mail paging system (E-mail Paging System; EPS) network or a general packet radio service (General Packet Radio Service; GPRS) network.

In the embodiment of the present invention, the execution subject of the foregoing steps is a home subscriber register. In different networks, the home subscriber register is a different network device, for example, it may be a network device such as an HLR (Home Location Register) or an HSS (Home Subscriber Server).

When a group of MTC devices in a same location in the network update the location, the first MTC device in the group of MTC devices initiates a location management request to the mobility management network element, where the location management request includes the device identity and/or the group identity of the first MTC device.

In different networks, the mobility management network element is a different network device, for example, it may be a network device such as a servicing GPRS support node (Servicing GPRS Support Node; SGSN) or a mobility management entity (Mobility Management Entity; MME).

The first MTC device may be any one device in the MTC device group, and may also be a special device in the MTC device group. For example, the first MTC device is a master device in the MTC device group. In the embodiment of the present invention, for ease of description, any one device in the MTC device group is referred to as the first MTC device, which does not limit the present invention. Because the first MTC device may not be attached to the mobility management network element, the location management request may be an attach request (Attach Request) sent by the first MTC device to the mobility management network element. If the first MTC device is already attached to the current mobility management network element, the location management request sent by the first MTC device to the mobility management network element may be a location update request, for example, in a GPRS or a UTMS network, the location management request sent by the first MTC device to the mobility management network element may be a routing area update request (Routing Area Update Request, RAU Request), and in an EPS network, the location management request may be a tracking area update request (Tracking Area Update Request, TAU Request).

The mobility management network element, after receiving the location management request initiated by the first MTC device, sends the location update message (Update Location) to the home subscriber register, where the location update message includes the device identity of the first MTC device, and the device identity may be an international mobile subscriber identification number (International Mobile Subscriber Identification Number; IMSI), or a packet-temporary mobile subscriber identity (Packet-Temporary Mobile Subscriber Identity; P-TMSI).

The home subscriber register, after receiving the location update message sent by the mobility management network element, updates the subscription data of all the MTC devices in the group according to the group identity of the group to which the first MTC device belongs. The updating the subscription data of all the MTC devices in the group specifically may be: updating mobility management network element information of all the MTC devices, where the mobility management network element information includes: a sequence number of a mobility management network element and an address of the mobility management network element. If subscription information of the first MTC device has no information of other mobility management network elements, the home subscriber register may directly add the sequence number of the current mobility management network element and the address of the mobility management network element for all the MTC devices in the group. If the subscription information of the first MTC device has the information of other mobility management network elements, the home subscriber register may update the information of other mobility management network elements to make it be information of the current mobility management network element, thereby implementing update of the subscription data of the first MTC device.

Each device in a group of MTC devices has the device identity, for example, the IMSI or the P-TMSI. In addition, a group of MTC devices further have the group identity.

The first MTC device, when initiating the location management request to the mobility management network element, may carry the group identity in the location management request, so that the mobility management network element may acquire the group identity from the received location management request. In this condition, the mobility management network element may carry the group identity in the location update message sent to the home subscriber register. The subscription data of a group of MTC devices is stored in the home subscriber register beforehand, where the group subscription data includes the group identity, the device identity of all the devices in the group, and information of quality of service (Quality of Service; QoS) of the MTC device group. Therefore, the home subscriber register may directly update the subscription data of all the MTC devices in the group according to the group identity carried in the location update message.

In addition, if a group of MTC devices are already attached to other mobility management network elements, the device identity and the group identity of the group to which the devices belong may also be saved on the other mobility management network elements. Therefore, the current mobility management network element may also acquire the group identity from interaction signaling, for example, an identification response (Identification Response), of the mobility management network element attached to the first MTC device.

The group subscription data of a group of MTC devices is stored in the home subscriber register, and therefore, the home subscriber register further searches, according to the device identity of the first MTC device, the group subscription data of the group to which the first MTC device belongs for the group identity that is stored beforehand, and updates the subscription data of all the devices in the group according to the found group identity.

The home subscriber register, after updating the subscription data of all the MTC devices in the group, sends subscription data of the group to the mobility management network element, where the group subscription data includes the group identity and/or the device identity list of all the devices in the group, so that the mobility management network element, after receiving the location management request initiated by one or more other devices in the group, does not initiate the location update message to the home subscriber register anymore.

Specifically, the group subscription data sent by the home subscriber register to the mobility management network element may include the group identity only. After the mobility management network element receives a location management request initiated by other MTC devices, if the location management request carries the group identity and the group identity is consistent with the group identity in the group subscription data delivered by the home subscriber register, the mobility management network element can determine that location update is performed on all the devices in the group to which the MTC device belongs, and the mobility management network element does not initiate the location update message to the home subscriber register anymore.

The group subscription data sent by the home subscriber register to the mobility management network element may include the device identity list in the group only, or not only include the device identity list but also include the group identity. The mobility management network element, after receiving the location management request initiated by other devices, may directly determine whether the device identity of the MTC device exists in the device identity list. If the device identity of the MTC device exists in the device identity list, it is indicated that location update is performed on all the devices in the group to which the MTC device belongs, and the mobility management network element does not initiate the location update message to the home subscriber register anymore.

In addition, the home subscriber register may further return the subscription data of the first MTC device, or the subscription data of all the devices in the group to the mobility management network element. Therefore, the mobility management network element may directly create a bearer for the first MTC device or one or more other devices in the group, and does not need to acquire the subscription data of the device from the home subscriber register again.

It should be noted that, the first MTC device may be any one MTC device in the group to which the MTC device belongs, may be a first, a second, a third or an $N^{th}$ (N>0) MTC device in the group to which the MTC device belongs which initiates the location management request to the mobility management network element. However, it may be understood that, if the first MTC device is an MTC device in the group which first initiates the location management request to the mobility management network element, the home subscriber register performs location update on all the MTC devices in the whole group when the first MTC device in the group initiates the location management request. Relatively, network resources are saved to the largest extent, the signaling transmission between devices is the minimum, and the efficiency of the network control over the group is the highest.

As another preferred implementation manner, the first MTC device may also be a master device in the group. The master device is configured to initiate the location update of the group, that is, when the location update needs to be performed on the whole group, it is required that only when the master device initiates a location management request to the network, the home subscriber register may update the subscription data of all the MTC devices in the whole group. Except the master device, other MTC devices in the group may be slave devices. These slave devices may initiate the location management request to the mobility management network element. But after the mobility management network element, after receiving the location management request, initiates the location update message to the home subscriber register, the home subscriber register can only update the subscription data of the slave device, and cannot perform location update on other MTC devices in the group to which the slave device belongs. And it relates to that, if the master device in the group initiates the location management request lastly, at this time, other slave devices in the group have initiated the location management request, and it is probable that the location update is completed. In this condition, the priority may be set for the master device in the group, so as to enable the master device to initiate the location management request first, or to initiate the location management request sooner relative to other slave devices.

In the method for location management of a group-based MTC device provided by the embodiment of the present invention, the mobility management network element receives the location management request initiated by one MTC device in a group of MTC devices, and initiates the location update request to the home subscriber register, and the home subscriber register updates subscription data of all the MTC devices in the group according to the group identity of the group to which the device belongs, thereby saving network resources, reducing signaling transmission between the network and the device, and improving the efficiency of the network control over the group of devices.

Figure 2:
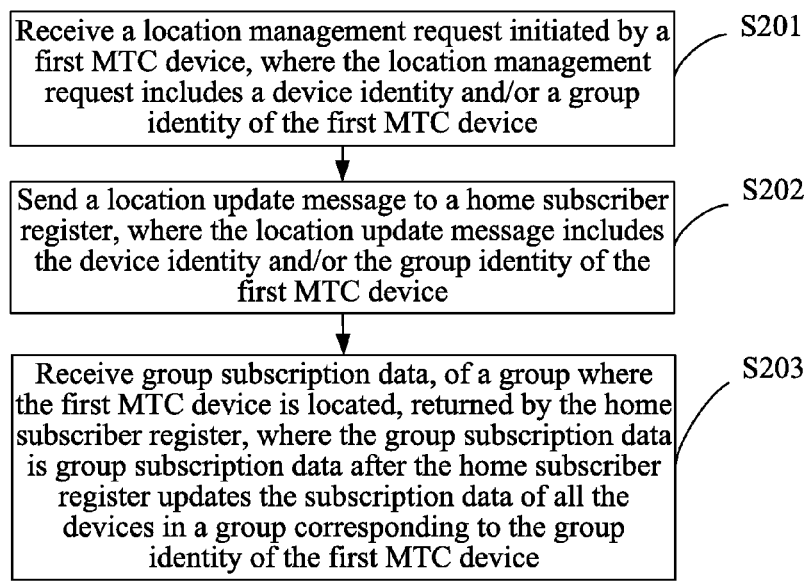
FIG. 2 is a flow chart of a second embodiment of a method for location management of a group-based MTC device provided by the present invention.

FIG. 2 is a flow chart of a second embodiment of a method for location management of a group-based MTC device provided by the present invention, and as shown in FIG. 2, the method includes the following steps.

S201: Receive a location management request initiated by a first MTC device, where the location management request includes a device identity and/or a group identity of the first MTC device.

S202: Send a location update message to a home subscriber register, where the location update message includes the device identity and/or the group identity of the first MTC device.

S203: Receive group subscription data, of a group to which the first MTC device belongs, returned by the home subscriber register, where the group subscription data is group subscription data after the home subscriber register updates the subscription data of all the devices in a group corresponding to the group identity of the first MTC device, and the group subscription data includes the group identity and/or a device identity list of all the devices in the group.

In the embodiment of the present invention, an execution subject of the foregoing steps is a mobility management network element, and in different networks, the mobility management network element is a different network device, for example, it may be a network device such as an SGSN or an MME.

When a group of MTC devices in a same location in the network perform location update, the first MTC device in the group of the devices initiates a location management request to the mobility management network element, where the location management request includes the device identity of the first MTC device.

The first MTC device may be any device in the MTC device group, and the location management request may be an attach request (Attach Request), and may also be an RAU or a TAU.

The mobility management network element, after receiving the location management request initiated by the first MTC device, initiates the location update message (Update Location) to the home subscriber register.

In some scenarios, the device identity of the first MTC device included in the location management request and the device identity of the first MTC device included in the location update message may be the same identities, for example, may be a same IMSI. In some other scenarios, the device identity of the first MTC device included in the location management request and the device identity of the first MTC device included in the location update message may further be different identities, for example, the device identity of the first MTC device included in the location management request is an P-TMSI, while the device identity of the first MTC device included in the location update message is an IMSI.

The home subscriber register, after receiving the location update message sent by the mobility management network element, updates the subscription data of all the devices in the group according to the group identity of the group to which the first MTC device belongs.

The first MTC device, when initiating the location management request to the mobility management network element, may carry the group identity in the location management request, so that the mobility management network element may acquire the group identity from the received location management request. In this condition, the mobility management network element may carry the group identity in the location update message sent to the home subscriber register. The subscription data of a group of MTC devices is stored in the home subscriber register beforehand, and therefore, the home subscriber register may directly update the subscription data of all the devices in the group according to the group identity carried in the location update message.

In addition, if a group of MTC devices are already attached to other mobility management network elements, the device identity and the group identity of the group to which the device belongs may also be saved on the other mobility management network elements. Therefore, the current mobility management network element may also acquire the group identity from interaction signaling of the mobility management network element attached to the first MTC device.

The group subscription data of a group of MTC devices is stored in the home subscriber register, and therefore, the home subscriber register further searches, according to the device identity of the first MTC device for the group identity, the group subscription data of the group to which the first MTC device belongs that is stored beforehand, and updates the subscription data of all the devices in the group according to the found group identity.

The home subscriber register, after updating the subscription data of all the MTC devices in the group, sends subscription data of the group to the mobility management network element, where the group subscription data includes the group identity and/or the device identity list of all the devices in the group, so that the mobility management network element, after receiving the location management request initiated by one or more other devices in the group, does not initiate the location update message to the home subscriber register anymore.

Specifically, the group subscription data sent by the home subscriber register to the mobility management network element may include the group identity only. After the mobility management network element receives a location management request initiated by other MTC devices, if the location management request carries the group identity and the group identity is consistent with the group identity in the group subscription data delivered by the home subscriber register, the mobility management network element can determine that location update is performed on all the devices in the group to which the MTC device belongs, and the mobility management network element does not initiate the location update message to the home subscriber register anymore.

The group subscription data sent by the home subscriber register to the mobility management network element may include the device identity list in the group only, or not only include the device identity list but also include the group identity. The mobility management network element, after receiving the location management request initiated by other devices, may directly determine whether the device identity of the MTC device exists in the device identity list. If the device identity of the MTC device exists in the device identity list, it is indicated that location update is performed on all the devices in the group to which the MTC device belongs, the mobility management network element does not initiate the location update message to the home subscriber register anymore.

Further, the home subscriber register may further return the subscription data of the first MTC device, or the subscription data of all the devices in the group to the mobility management network element. Therefore, the mobility management network element may directly create a bearer for the first MTC device or one or more other devices in the group, and does not need to acquire the subscription data of the device from the home subscriber register again.

The first MTC device may be any one MTC device in the group, and may be a first, a second, a third or an $N^{th}$ (N>0) MTC device in the group which initiates the location management request to mobility management network element. The first MTC device may also be a master device in the group. The master device is configured to initiate the location update of the group, that is, when the location update needs to be performed on the whole group, it is required that only when the master device initiates the location management request to the network, the home subscriber register can update the subscription data of all the devices in the whole group.

In the method for location management of a group of MTC devices provided by the embodiment of the present invention, the mobility management network element receives the location management request initiated by one device in a group of devices, and initiates the location update request to the home subscriber register, and the home subscriber register updates subscription data of all the devices in the group according to the group identity of the group to which the device belongs, thereby saving network resources, reducing signaling transmission between the network and the device, and improving the efficiency of the network control over the group of devices.

Figure 3:
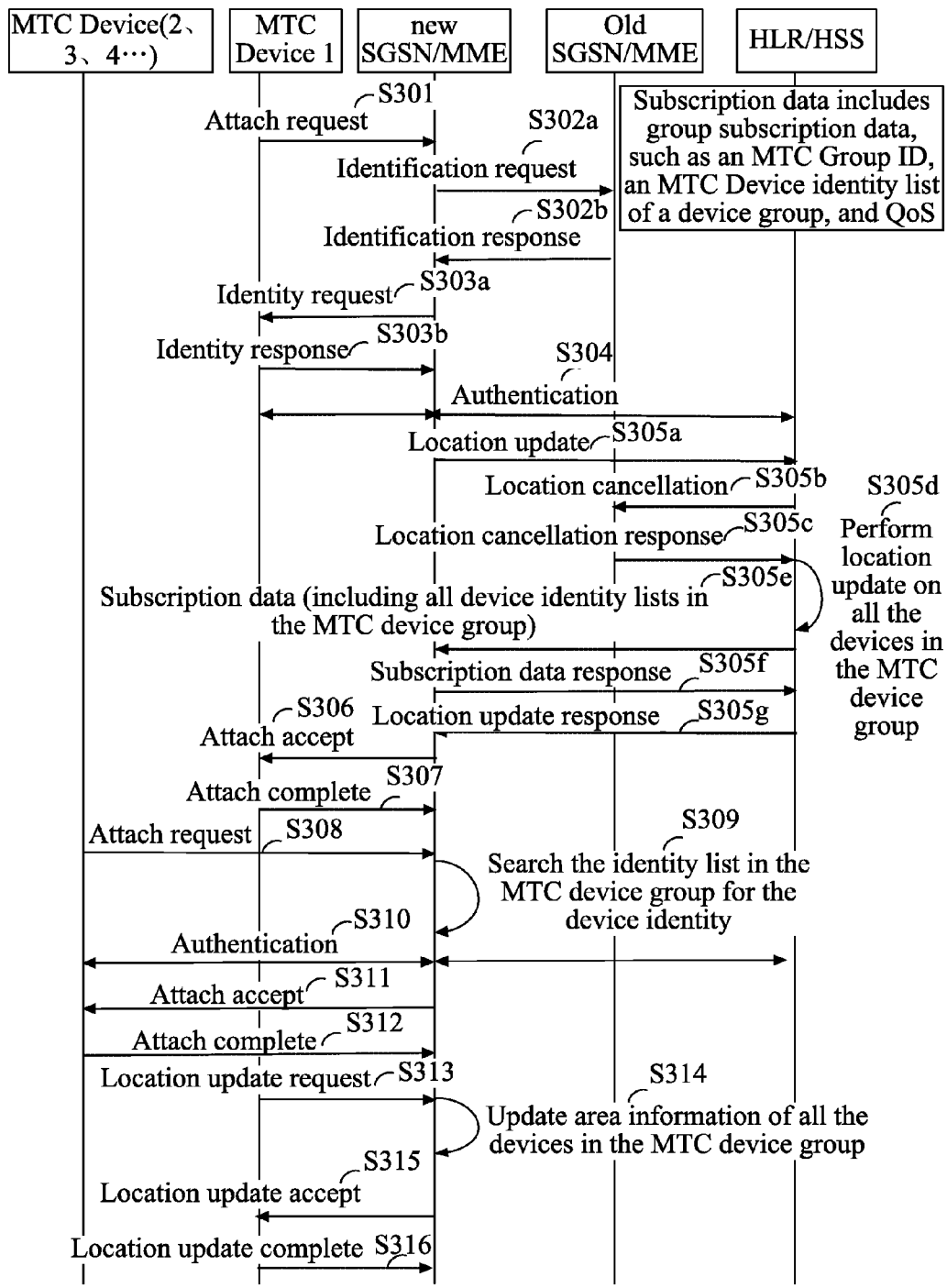
FIG. 3 is a signaling diagram of a third embodiment of a method for location management of a group-based MTC device provided by the present invention.

FIG. 3 is a signaling diagram of a third embodiment of a method for location management of a group-based MTC device provided by the present invention, and as shown in FIG. 3:

The embodiment provides a specific scenario occurring when a group of MTC devices perform location update that: a first MTC device that initiates the location management request is not attached to a current mobility management network element, no bearer is created between the MTC device and an original mobility management network element, and a gateway to which the MTC device is connected is not changed. A specific scenario is taken as an example for illustration only in this embodiment, but the present invention is not limited thereto.

It should be noted that, interaction signaling or information carried in the interaction signaling described in the following embodiment is information relevant to the present invention, while other existing interaction signaling or other existing information carried in the signaling is not mentioned one by one anymore, for example, information such as UE core network capability (UE Core Network Capability) which a TAU request carries, an old globally unique temporary UE identity (old GUTI), a last visited tracking area identity (last visited TAI), an active flag (active flag), an EPS bearer status (bearer status), an P-TMSI identity signature (Signature), an additional globally unique temporary UE identity (additional GUTI), an evolved key set identifier (evolved Key Set Identifier; eKSI), a network attached storage (Network Attached Storage; NAS) sequence number (sequence number), an NAS layer message authentication code (NAS-MAC), and a key set identifier (Key Set Identifier; KSI).

The method specifically includes the following steps:

S301: An MTC Device1 (that is, a first MTC device) in a group of MTC devices sends an attach request (that is, a location management request) to a current mobility management network element (a new SGSN/MME).

The MTC Device1 is an MTC device in the group which first re-initiates the attach request (Attach Request) to the network, information carried in the Attach Request includes a device identity of the MTC device, for example, information such as an IMSI or an P-TMSI, and an old routing area identity (Routing Area Identity; RAI).

In addition, the attach request may further carry a group identity (MTC Group ID).

S302a: The current mobility management network element sends an identification request (Identification Request) to the mobility management network element to which the MTC Device1 is originally attached.

The current mobility management network element is represented as a new SGSN/MME, and an original network entity is represented as an old SGSN/MME.

S302b: The original mobility management network element returns an identification response (Identification Response) to the current mobility management network element.

The identification response includes the device identity of the MTC Device 1. In addition, if the Attach Request initiated by the MTC Device1 in S301 carries no group identity, the original mobility management network element may carry the group identity (MTC Group ID) of the group to which the MTC Device1 belongs in the identification response.

S303a: The current mobility management network element sends the identity request (Identity Request) to the MTC Device1.

If the current mobility management network element and the original mobility management network element cannot identify the device identity of the MTC Device1, the current mobility management network element may send the identity request (Identity Request) to the MTC Device1, and request to acquire the device identity of the MTC Device1.

S303b: The MTC Device1 returns the identity response to the current mobility management network element.

The identity response carries the device identity. In addition, if the Attach Request initiated by the MTC Device1 in S201 carries no group identity, or, the original mobility management network element in S302b carries no group identity in the identification response, the MTC Device1 may carry the group identity of the group to which the MTC Device1 belongs in the identity response.

It should be noted that, if it is the first time for the MTC Device1 to be attached to the network, the MTC Device1 directly sends the attach request to the current mobility management network element, and the MTC Device1 completes corresponding location update at the same time of completing attachment. In this condition, the original mobility management network element does not exist, and therefore, S302a to S303b do not exist. After the mobility management network element receives the attach request sent by the MTC Device1 in S201, S304 is directly executed.

S304: A home subscriber register performs authentication on the MTC Device1.

After the authentication, the current mobility management network element sends a location update message to the home subscriber register, and starts a process of location update, which specifically includes the following steps.

S305a: The current mobility management network element sends the location update message (Update Location) to the home subscriber register.

The location update message includes the device identity. If the attach request sent by the MTC Device1 to the current mobility management network element in S201 carries the group identity, the location update message sent by the current mobility management network element in S305a may also carry the group identity.

In addition, the location update message may further carry information of the original mobility management network element, which includes a mobility management network element sequence number (SGSN/MME Number) and a mobility management network element address (SGSN/MME Address). But if the original mobility management network element does not exist, the location update message does not carry the information of the mobility management network element.

S305b: The home subscriber register sends a location cancellation request (Cancel Location) to the original mobility management network element.

S305c: The original mobility management network element sends a location cancellation response (Cancel Location ACK) to the home subscriber register.

If the original mobility management network element does not exist, correspondingly, S305b and S305c do not exist, but S305d is directly executed.

S305d: The home subscriber register performs location update on all the devices in the group according to the group identity corresponding to the device identity.

If the attach request sent by the MTC Device1 to the mobility management network element in S301 carries the group identity, and the location update message sent by the mobility management network element to the home subscriber register in S305a carries the group identity, the home subscriber register may directly perform location update on all the MTC devices in the device group according to the group identity MTC Group ID, and the performing location update specifically is: updating the mobility management network element information of all the MTC devices in the group. If the mobility management network element information of all the MTC devices in the group is the information of the original mobility management network element, the home subscriber register updates the information of the original mobility management network element to make it be the information of the current mobility management network element. If the original mobility management network element does not exist, the home subscriber register adds the information of the current mobility management network element for the devices in the group.

S305e: The home subscriber register delivers group subscription data to the current mobility management network element.

The group subscription data may include the group identity and/or a device identity list.

In addition, the group subscription data may further include the subscription data of the MTC Device1, and may further include the subscription data of other MTC devices in the group and QoS information of the group.

S305f: The current mobility management network element returns the subscription data response (Insert Subscription ACK) message to the home subscriber register.

S305g: The home subscriber register returns a location update response (Update Location ACK) message to the current mobility management network element.

S306: The current mobility management network element sends an attach accept message (Attach Accept) to the MTC Device1.

S307: The MTC Device1 sends the attach complete information (Attach Complete) to the current mobility management network element.

S308: Other MTC devices in the group (for example, an MTC Device2 or an MTC Device3) initiate the attach request (Attach Request) to the current mobility management network element.

The attach request includes the device identity, and further may include the group identity.

S309: The current mobility management network element searches the device identity list for existence of the device identity of the MTC device.

S310: The current mobility management network element finds the device identity of the MTC device in the device identity list, and performs authentication on the MTC device.

The current mobility management network element finds the device identity of the MTC device in the device identity list, which indicates that the mobility management network element information of the group where the MTC device in the home subscriber register is located is updated, and the current mobility management network element does not need to send the location update message (Update Location) to the home subscriber register again.

It should be noted that, the condition that the group subscription data delivered by the home subscriber register to the current mobility management network element includes the device identity list is corresponding to S309 and S310, and in this condition, the current mobility management network element may directly search the device identity list for existence of the device identity.

In addition, if the group subscription data delivered by the home subscriber register to the current mobility management network element includes the group identity only, and the attach request initiated by other MTC devices in the group in S308 includes the group identity, the current mobility management network element may determine whether location update is performed on the group to which one or more other devices belong according to the group identity.

S311: The current mobility management network element sends attach accept information (Attach Accept) to other MTC devices initiating the location update request.

S312: Other MTC devices initiating the location update request send the attach complete information (Attach Complete) to the current mobility management network element.

It is mainly described in this embodiment that, after the MTC device first initiating the location request to the network in the group initiates the location management request, the home subscriber register may update subscription data of all the MTC devices in the group according to the group identity to which the MTC device belongs, so as to implement location update of all the MTC devices in the group. If other MTC devices in the group initiate the location management request again, the location update is not required to be performed again.

It should be noted that, the home subscriber register may also perform location update on all the MTC devices in the whole group when a second, a third or an $N^{th}$ (N>0) device initiates the location management request to the network. However, it may be understood that, the location update is performed on all the MTC devices in the whole group when the first MTC device in the group initiates the location management request to the network. Relatively, the network resources are saved to the largest extent, signal transmission between MTC devices is the minimum, and the efficiency of the network control over a group of MTC devices is the highest.

Further, except that the location update is performed on all the MTC devices in the whole group when the $N^{th}$ MTC device in the group initiates the location management request to the network, another preferred implementation manner is as follows:

The device initiating the location management request is a master device in the group, which is still represented as the MTC Device1 here, but the MTC Device1 is not necessary to be the MTC device in the group which first initiates the attach request. The master device is configured to initiate location update of a group, that is, when the location update needs to be performed on the whole group, it is required that only when the master device initiates the location management request to the network, all the MTC devices in the whole group may be updated. The home subscriber register, besides storing the group identity and the device identity list, also stores a master device identity of the group, and may also store information such as QoS of the group.

Except the master device, other MTC devices in the group may be slave devices. These slave devices may initiate the attach request to the mobility management network element. But after the mobility management network element, after receiving the attach request, initiates the location update to the home subscriber register, the home subscriber register can only update mobility management network element information of the slave device, and cannot perform location update on other MTC devices in the group to which the slave device belongs. Only when the master device initiates the attach request, the home subscriber register determines that the master device is the master device of the MTC device group through the device identity of the master device, and then can perform location update on all the MTC devices in the group. And it relates to that, if the master device in the network initiates the attach request to the mobility management network element lastly, at this time, other slave devices in the group already initiates the attach request, and it is probable that the location update is completed. In this condition, the objective that location update is performed on all the MTC devices in the whole group according to the location update request of one device cannot be accomplished. Therefore, a priority may be set for the master device, so as to enable the master device to initiate the attach request to the mobility management network element first, or to initiate the attach request sooner relative to other slave devices.

For the condition that the MTC Device1 is the master device, steps S301-S312 are still executed. On this basis, in a home subscription register, the update time or period of the slave device in the group may be set as 0, so that these slave devices can only initiate the attach request, and cannot send the location management request to the mobility management network element. When the group is periodically updated, for example, when being switched from one cell to another cell, the master device initiates the location update request (that is, the location management request) to the mobility management network element, and therefore, when the MTC Device1 is the master device, the method may further include the following steps.

S313: The MTC Device1 sends the location update request to the mobility management network element.

The location update request carries the device identity.

S314: The mobility management network element may determine that the device is the master device according to the device identity of the MTC Device1, and update area information of all the devices in the group according to the group identity of the group to which the MTC device belongs.

The area information is used to indicate the location of devices in the group. The location update request may be the location update request initiated when the MTC Device1 is from one cell to another cell. After the mobility management network element receives the request, an original cell identity (that is, the area information) of all the MTC devices in the group to which the MTC Device1 belongs is updated.

S315: The mobility management network element sends location update accept information (RAU/TAU Accept) to the MTC Device 1.

S316: The MTC Device1 sends location update complete information (RAU/TAU Complete) to the mobility management network element.

Figure 4:
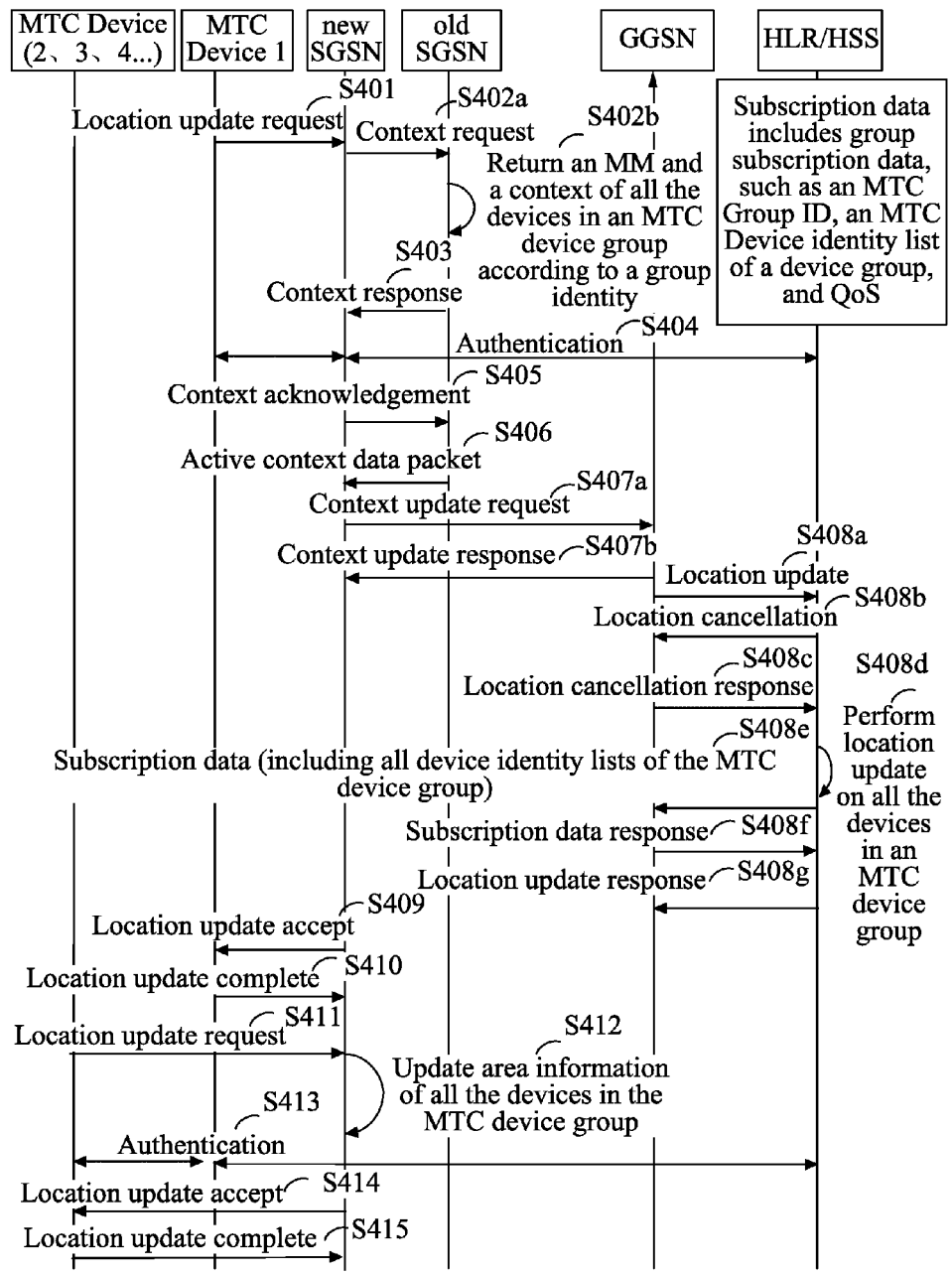
FIG. 4 is a signaling diagram of a fourth embodiment of a method for location management of a group-based MTC device provided by the present invention.

FIG. 4 is a signaling diagram of a fourth embodiment of a method for location management of a group-based MTC device provided by the present invention, and as shown in FIG. 4:

The previous embodiment gives a scenario that an MTC device initiating a location management request is not attached to a current mobility management network element, no bearer connection is created between the MTC device and an original mobility management network element, and a gateway to which the device is connected is not changed. The difference between this embodiment and the previous embodiment lies in that: the MTC device initiating the location management request is attached to the current mobility management network element, and a bearer connection is created between the MTC device and the original mobility management network element, but the gateway to which the MTC device is connected is not changed. The method provided by this embodiment specifically includes the following steps.

S401: An MTC Device1 (that is, a first MTC device) sends a location update request (RAU Request) (that is, a location management request) to a current SGSN.

In this embodiment, a mobility management network element is an SGSN, and the RAU Request carries a device identity, and additionally may carry a group identity (MTC Group ID).

S402*a*: The current SGSN sends a context request (SGSN Context) to an original SGSN.

The request carries an MTC Group ID, and requests to acquire the MTC Device1, and the mobility management (Mobility Management; MM) and the context of all the devices in the MTC device group.

S402*b*: The original SGSN returns the MM and the context of all the devices in the group to the current SGSN.

S403: The original SGSN sends a context response (SGSN Response) to the current SGSN.

S404: A home subscriber register performs authentication on the MTC Device1.

S405: The current SGSN sends a SGSN Context acknowledgement request to the original SGSN.

The SGSN Context acknowledgement request indicates that all active context data packets may be received. The request carries the group identity.

S406: The original SGSN sends all the active context data packets to the current SGSN.

S407a: The current SGSN sends a context request of updating all the devices in the group to a gateway (GGSN).

The request needs to carry the group identity.

S407a: The gateway, after completing all the context update, returns a response to the current SGSN.

S408a to S408g are the same as steps executed in S305a to S305g of the previous embodiment, and reference may be made to the previous embodiment for details, which are not described again.

S409: The current SGSN sends location update accept information (RAU Accept) to the MTC Device1.

S410: The MTC Device1 sends location update complete information (RAU Complete) to the current SGSN.

The MTC Device1 may be a master device in the group, and in this condition, other MTC devices in the group do not initiate the location update request again.

The MTC Device1 may also be the MTC device which first initiates the location update, and in this condition, the following steps may further be included:

S411: Other MTC devices in the group (for example, an MTC Device2 or an MTC Device3) initiate the attach request (Attach Request) to the current SGSN.

The attach request includes the device identity.

S412: The current SGSN searches a device identity list for existence of the device identity of the MTC device.

S413: The current SGSN finds the device identity of the MTC device in the device list, and authentication is performed on the MTC device.

S414: The current SGSN sends the attach accept information (Attach Accept) to other MTC devices initiating the location update request.

S415: Other MTC devices initiating the location update request send the attach complete information (Attach Complete) to the current SGSN.

Figure 5:
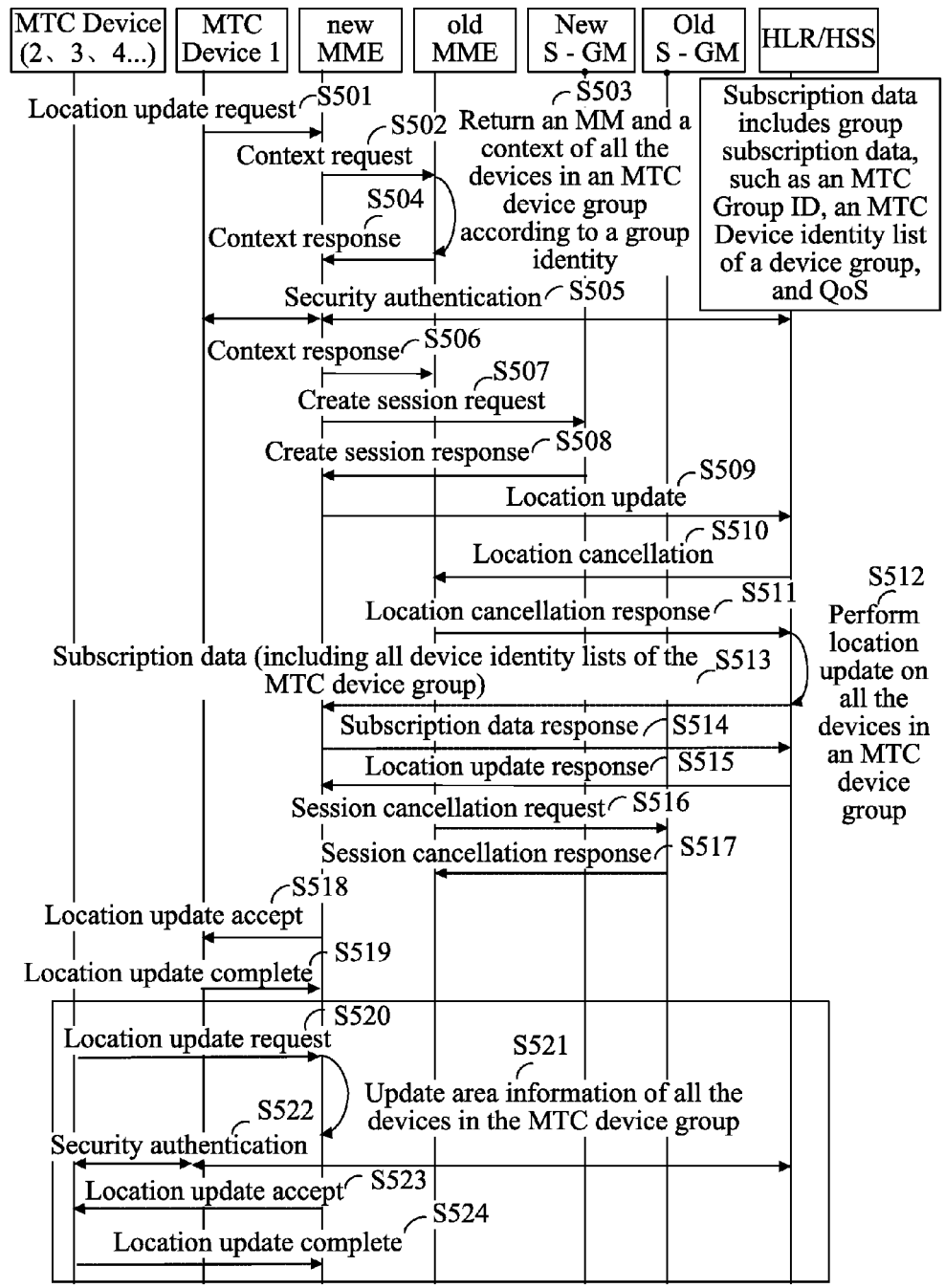
FIG. 5 is a signaling diagram of a fifth embodiment of a method for location management of a group-based MTC device provided by the present invention.

FIG. 5 is a signaling diagram of a fifth embodiment of a method for location update of a group-based MTC device provided by the present invention, and as shown in FIG. 5:

A specific scenario given in this embodiment is that: The MTC device initiating the location management request is attached to the current mobility management network element, and a context connection is created between the MTC device and the original mobility management network element. The difference between this embodiment and the previous embodiment lies in that, the gateway to which the MTC device is connected is also changed, and a connection with a first gateway is changed to a connection with a second gateway. Therefore, in the method provided by this embodiment, a session connection with an original gateway needs to be deleted, and a session connection is created between the MTC device and a current gateway. The method provided by this embodiment specifically includes the following steps.

S501: An MTC Device1 (that is, a first MTC device) sends a location update request (that is, a location management request, which may be: a message such as an RAU or a TAU) to a current mobility management network element.

The location update request may include a group identity of the group to which the MTC device belongs.

S502: The current mobility management network element sends a context request (Context Request) to the original mobility management network element.

User information is acquired by sending the context request. The request carries the group identity of the group.

S503: The original mobility management network element acquires context information of all the devices according to the group identity.

S504: The original mobility management network element sends a context response (Context Response) to the current mobility management network element.

The response includes context information of all the MTC devices in the group.

S505: A home subscriber register (HLR/HSS) performs security authentication on the MTC Device1.

S506: The current mobility management network element sends a context response (Context Acknowledge) to the original mobility management network element.

The Context Acknowledge message carries the group identity and a gateway change indication, which indicates that gateways of all the MTC devices in the group need to be changed.

S507: The current mobility management network element sends a create session request (Create Session Request) to a second gateway.

The create session request carries the group identity of a group of MTC devices.

S508: The second gateway returns the create session response (Create Session Response) to the current mobility management network element.

S509: The current mobility management network element sends the location update request (Update Location) to the home subscriber register.

The request carries the device identity of the MTC Device1 and the group identity of the group to which the MTC Device1 belongs.

S510: The home subscriber register sends a location cancellation request (Cancel Location) to the original mobility management network element.

The request carries a group identity request type Cancellation Type, but does not need to carry the device identity of each MTC device.

S511: The original mobility management network element sends a location cancellation response (Cancel Location ACK) to the home subscriber register.

The response carries the group identity, but does not need to carry the device identity of the MTC Device1.

S512 to S515 are the same as S408a to S408g in the previous embodiment, and are not described again.

S516: The original mobility management network element sends a delete session request (Delete Session Request) to the first gateway.

The delete session request carries the group identity, so as to delete sessions of all the MTC devices in the group.

S517: The first gateway returns the delete session response (Delete Session Response) to the original mobility management network element.

S518 and S519: The MTC Device1 and the current mobility management network element complete mutual acknowledgement of the location update.

Similar to the previous embodiment, if the MTC Device1 is a master device of the group, other MTC devices in the MTC device group do not initiate the location update request again.

If the MTC Device1 is the MTC device which first initiates location update, the following steps may further be included.

S520: Other MTC devices in the group (for example, an MTC Device2 or an MTC Device3) initiate an attach request (Attach Request) to the current mobility management network element.

The attach request includes the device identity.

S521: The current mobility management network element searches the device identity list for existence of the device identity of the MTC device.

S522: The current mobility management network element finds the device identity of the MTC device in the device list, and performs authentication on the MTC device.

The current mobility management network element searches the device list for the device identity of the MTC device, which indicates that mobility management network element information, in the home subscriber register, of the group to which the MTC device belongs is updated, and the current mobility management network element does not need to send the location update message (Update Location) to the home subscriber register again.

S523: The current mobility management network element sends the attach accept information (Attach Accept) to other MTC devices initiating the location update request.

S524: Other MTC devices initiating the location update request send attach complete information (Attach Complete) to the current mobility management network element.

Figure 6:
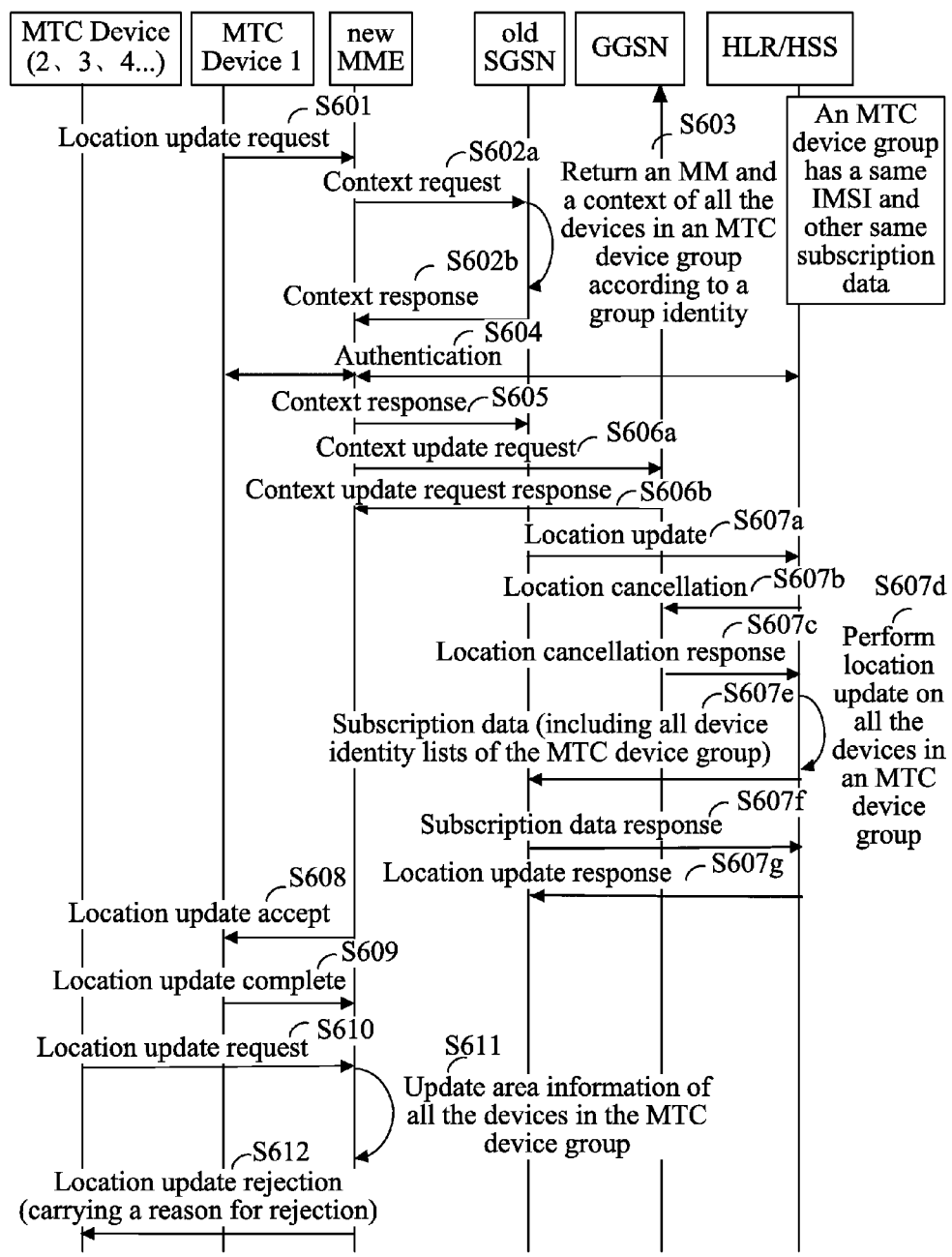
FIG. 6 is a signaling diagram of a sixth embodiment of a method for location management of a group-based MTC device provided by the present invention.

FIG. 6 is a signaling diagram of a sixth embodiment of a method for location update of a group-based MTC device provided by the present invention, and as shown in FIG. 6:

In the method provided by this embodiment, a group of MTC devices are all attached to the mobility management network element, and the difference between this embodiment and the several previous embodiments lies in that, the group of MTC devices have the same device identity (an IMSI or a P-TMI) and subscription data. Therefore, only a copy of the subscription data is stored in the home subscriber register (HLR/HSS) for the MTC device in the group, that is, only one MTC device and the subscription information corresponding thereto are stored. Similar to the several previous embodiments, in the method, the MTC device initiating the location update may be the master device, or the MTC device in the group which first initiates the location update.

The process of S601 to S610 is a process executed after the master device or the MTC device in the group which first initiates location update initiates the location update request, and reference may be made to the several previous embodiments for details.

In the condition that the MTC device in the group which first initiates the location update initiates the location management request, if another MTC device in the group, for example, an MTC Device2, initiates the location management request to the network, the method further includes the following steps.

S611: The current mobility management network element determines that the device identity completes location update.

S612: The current mobility management network element returns a location update rejection response (RAU Reject) to the network.

Figure 7:
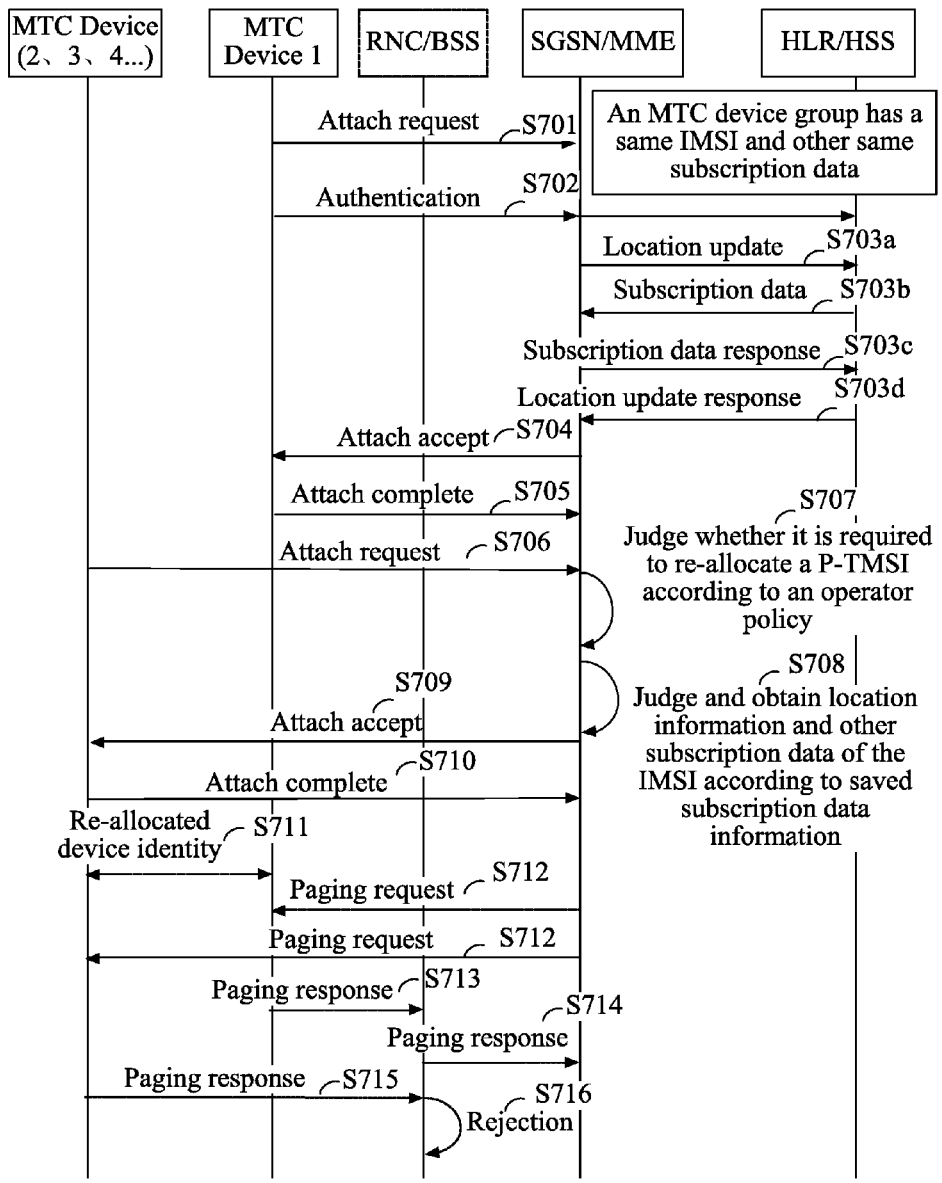
FIG. 7 is a signaling diagram in which a network pages a group of MTC devices when devices with the same subscription data perform first attachment provided by the present invention.

The location update rejection response may carry a reason for location update rejection that: the device identity completes the location update. Further, this embodiment also gives a process that when all the MTC devices in the group have the same device identity, that is, the same subscription data is shared in the home subscriber register, that is, the same device identity and other subscription information, these devices with the same subscription data perform first attachment, and the network performs paging on the MTC device group. Referring to FIG. 7, the process may include the following steps.

S701 to S705 are the process that the first MTC device MTC Device1 in a group of MTC devices performs first attachment. Reference may be made to the several previous embodiments for the process, which is not described again.

S706: An MTC Device2 initiates a first attach request to the mobility management network element.

The attach request carries the device identity (IMSI) the same as that of the MTC Device1.

S707: The mobility management network element determines whether it is required to re-allocate a temporary device identity (P-TMSI) for the MTC Device2 according to an operator policy.

If it is not required to re-allocate the temporary device identity for the MTC Device2, the mobility management network element sends the existing device identity to the MTC Device2. If it is required to re-allocate the device identity, the mobility management network element may regenerate a device identity and sends the device identity to the MTC Device2.

For the condition that the device identity is not re-allocated, all the MTC devices in the group may share the same device identity. For the condition that the device identity needs to be re-allocated, all the MTC devices in the group may have different device identities. In order to be capable of ensuring that the devices to which the device identity is allocated first accesses the network by using the device identity smoothly, the identify request (Identity Request) and the identity response (Identity Response) in the prior art may be used to replace the device identity, which may also be completed by using the following S711.

S708: The mobility management network element obtains by analysis that it is not required to update the location information and other subscription data according to the subscription data saved in the mobility management network element.

S709: The mobility management network element returns the attach accept (Attach Accept) to the MTC Device2.

The attach accept response carries the original device identity of the device or the device identity is re-allocated for the MTC device. If the attach accept response carries the device identity re-allocated for the device, S711 may further be executed.

S710: The MTC Device2 returns the attach complete (Attach Complete) to the mobility management network element.

S711: If the mobility management network element re-allocates the device identity for the MTC Device2, the device identity may be sent by using the communication signaling between MTC devices, thereby ensuring that all the MTC devices in the group have the re-allocated device identity.

S712 to S716 are mainly directed to the process that in a GPRS network, the network pages an MTC device, and are specifically as follows.

S712: The mobility management network element initiates a paging request (Paging) to an MTC device in the group.

The paging request carries the device identity of the MTC device.

S713 and S714: The first MTC device (which is represented as the MTC Device1) in the group sends a paging response (Paging Response) to the network.

S715: Another MTC device (which is represented as the MTC Device2) in the group sends the paging response (Paging Response) to the network likewise.

S716: A radio network controller (which may be a device such as an RNC or a BSS) returns a response to the network according to the MTC Device1 in the group.

Therefore, it may be obtained that a group of MTC devices with the same device identity in the group all receive the paging request, and therefore, other MTC devices in the group do not send a paging response (Paging Response) to the network entity anymore.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a read-only memory (Read-Only Memory, ROM), or a random access memory (Random Access Memory, RAM), etc.

Figure 8:
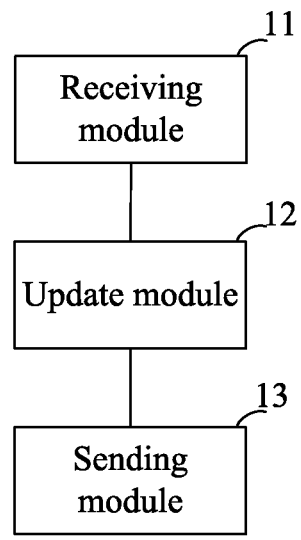
FIG. 8 is a schematic structural diagram of a first embodiment of a home subscriber register provided by the present invention.

FIG. 8 is a schematic structural diagram of a first embodiment of a home subscriber register provided by the present invention, and as shown in FIG. 8, the home subscriber register includes: a receiving module 11, an update module 12 and a sending module 13.

The receiving module 11 is configured to receive a location update message sent by a mobility management network element, where the location update message includes a device identity and/or a group identity of a first MTC device.

The update module 12 is configured to acquire the group identity of the first MTC device according to the location update message, and update subscription data of all MTC devices in a group corresponding to the group identity.

The sending module 13 is configured to send subscription data of the group to the mobility management network element, where the group subscription data includes the group identity and/or a device identity list of all the MTC devices in the group.

Figure 9:
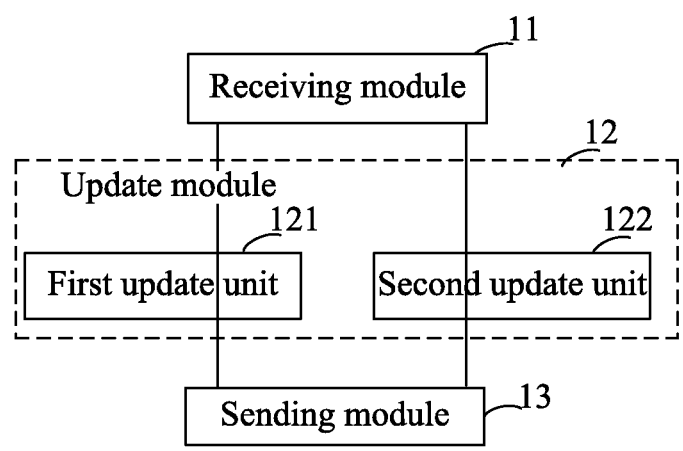
FIG. 9 is a schematic structural diagram of a second embodiment of a home subscriber register provided by the present invention.

FIG. 9 is a schematic structural diagram of a second embodiment of a home subscriber register provided by the present invention, and as shown in FIG. 9, on the basis of the previous embodiment, the update module 12 at least includes at least one of the following units:

a first update unit 121, configured to acquire the group identity of the first MTC device from the location update message; and a second update unit 122, configured to acquire, according to the device identity included in the location update message, the group identity from the subscription data of the group to which the first MTC device belongs that is stored beforehand.

The home subscriber register provided by the embodiment of the present invention is corresponding to the embodiment of the method for location management of a group-based MTC device provided by the present invention, and implements the functional devices of the method for location management of a group-based MTC device. Reference may be made to the method embodiment for the specific execution process thereof, which is not described again.

The home subscriber register provided by the embodiment receives the location update request initiated by the mobility management network element, and the home subscriber register updates the subscription data of all the devices in the group according to the group identity of the group to which the device belongs, thereby saving network resources, reducing signaling transmission between the network and the device, and improving the efficiency of the network control over the group of devices.

Figure 10:
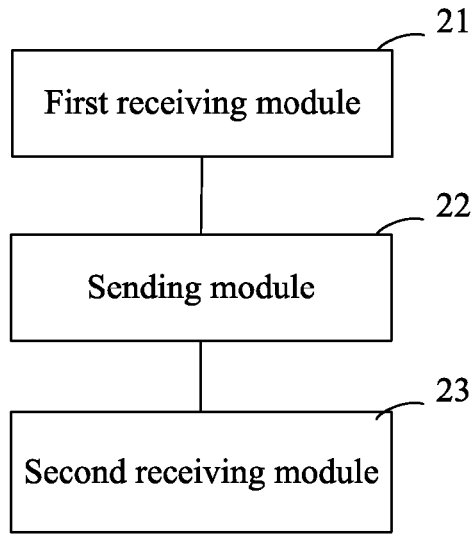
FIG. 10 is a schematic structural diagram of a first embodiment of a mobility management network element provided by the present invention.

FIG. 10 is a schematic structural diagram of a first embodiment of a mobility management network element provided by the present invention, and as shown in FIG. 10, the mobility management network element includes: a first receiving module 21, a sending module 22 and a second receiving module 23.

The first receiving module 21 is configured to receive a location management request initiated by a first MTC device, where the location management request includes a device identity and/or a group identity of the first MTC device.

The sending module 22 is configured to send a location update message to a home subscriber register, where the location update message includes the device identity and/or the group identity of the first MTC device.

The second receiving module 23 is configured to receive group subscription data, of a group to which the first MTC device belongs, returned by the home subscriber register, where the group subscription data is group subscription data after the home subscriber register updates subscription data of all devices in a group corresponding to the group identity of the first MTC device, and the group subscription data includes the group identity and/or a device identity list of all the devices in the group.

Figure 11:
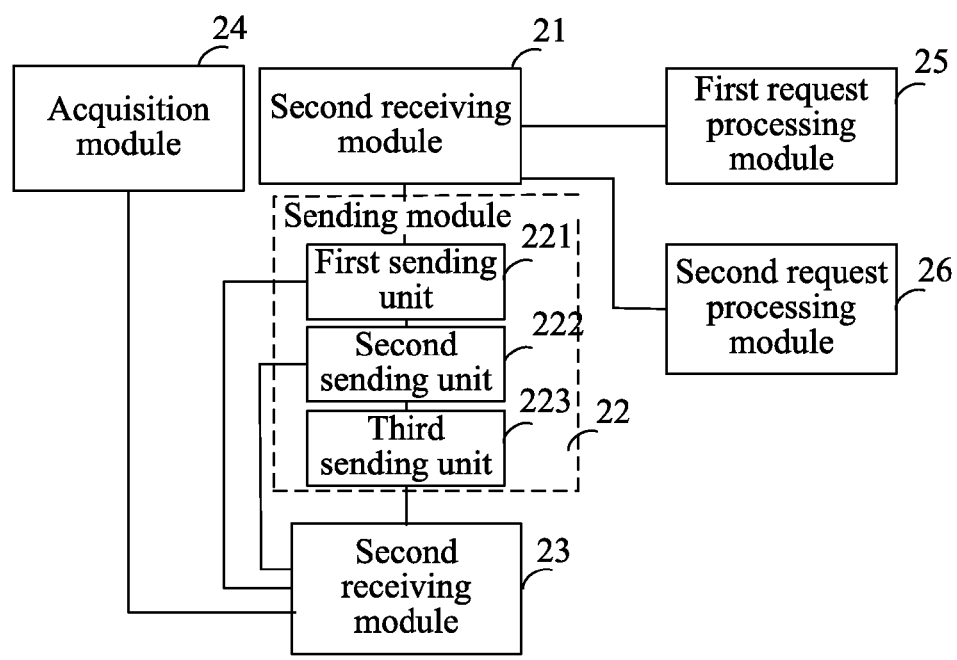
FIG. 11 is a schematic structural diagram of a second embodiment of a mobility management network element provided by the present invention.

FIG. 11 is a schematic structural diagram of a second embodiment of a mobility management network element provided by the present invention, and as shown in FIG. 11, on the basis of the previous embodiment, the mobility management network element may further include an acquisition module 24, configured to acquire the group identity from interaction signaling of a first mobility management network element originally corresponding to the first MTC device.

Further, the mobility management network element may further include:

The mobility management network element may further include at least one of the following modules a first request processing module 25, configured to, when the first receiving module 21 receives a location management request that is initiated by a second MTC device and includes a device identity of the second MTC device and a group identity of a group to which second MTC device belongs, if the group identity of the group to which second MTC device belongs is consistent with the group identity of the group to which the first MTC device belongs, return a receiving response of the location management request to the second MTC device, and a second request processing module 26, configured to, when the first receiving module 21 receives the location management request that is initiated by the second MTC device and includes the device identity of the second MTC device, if the device identity of the second MTC device exists in the device identity list, return the receiving response of the location management request to the second MTC device.

Further, the sending module 22 at least includes at least one of the following units a first sending unit 221, configured to, when a bearer connection is created between the first MTC device and the first mobility management network element, send a context request to the first mobility management network element, where the context request carries the group identity, so as to acquire a context, of all the devices in the group to which the first MTC device belongs, saved in the first mobility management network element, a second sending unit 222, configured to send an update bearer request to a first gateway, where the update bearer request carries the context of all the devices in the group to which the first MTC device belongs, so that a session connection is created between the first gateway and all the devices in the group to which the first MTC device belongs, and a third sending unit 223, configured to, when the first MTC device is changed from a connection with the first gateway to a connection with a second gateway, send a delete bearer request to the first gateway, where the delete bearer request carries the group identity, so that the first gateway releases the session connection with all the devices in the group to which the first MTC device belongs; and send a create bearer request to the second gateway, where the create bearer request carries the group identity, so that a session connection is created between the second gateway and all the devices in the group to which the first MTC device belongs.

The mobility management network element provided by the embodiment of the present invention is corresponding to the embodiment of the method for location management of a group-based MTC device provided by the present invention, and implements the functional devices of the method for location management of a group-based MTC device. Reference may be made to the method embodiment for the specific execution process thereof, which is not described again.

For the mobility management network element provided by the embodiment, the mobility management network element receives a location management request initiated by one MTC device in a group of MTC devices, and initiates a location update request to a home subscriber register, and the home subscriber register updates subscription data of all devices in the group according to the group identity of the group to which the device belongs, thereby saving network resources, reducing signaling transmission between the network and the device, and improving the efficiency of the network control over the group of devices.

Finally, it should be noted that the foregoing embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A method for location management of a group-based machine type communication (MTC) device, the method comprising:
   receiving a location update message sent by a mobility management network element, wherein the location update message comprises a device identity and/or a group identity of a first MTC device;
   acquiring the group identity of the first MTC device according to the location update message, and updating subscription data of all MTC devices in a group corresponding to the group identity;
   sending the subscription data of the group to the mobility management network element, wherein the subscription data comprises the group identity and/or a device identity list of all the MTC devices in the group; and
   after the sending the subscription data of the group to the mobility management network element,
      enabling the mobility management network element to receive a location management request initiated by a second MTC device, wherein the location management request carries a device identity of the second MTC device and a group identity of a group to which second MTC device belongs, and, if the group identity of the group to which second MTC device belongs is consistent with the group identity of the group to which the first MTC device belongs, returning a receiving response of the location management request to the second MTC device; or
      enabling the mobility management network element to receive a location management request initiated by a second MTC device, wherein the location management request carries a device identity of the second MTC device, and if the device identity of the second MTC device exists in the device identity list, returning a receiving response of the location management request to the second MTC device.

2. The method according to claim 1, wherein the acquiring the group identity of the first MTC device according to the location update message comprises:
   acquiring the group identity of the first MTC device from the location update message; or
   acquiring, according to the device identity comprised in the location update message, the group identity from the subscription data of the group to which the first MTC device belongs that is stored beforehand.

3. The method according to claim 1, wherein the location management request carries the device identity of the second MTC device and the group identity of a group to which second MTC device belongs, and wherein the method further comprises returning the receiving response of the location management request to the second MTC device when the group identity of the group to which second MTC device belongs is consistent with the group identity of the group to which the first MTC device belongs.

4. The method according to claim 1, wherein the location management request carries the device identity of the second MTC device, and wherein the method further comprises returning the receiving response of the location management request to the second MTC device when the device identity of the second MTC device exists in the device identity list.

5. A method for location management of a group-based machine type communication (MTC) device, the method comprising:
   receiving a location management request initiated by a first MTC device, wherein the location management request comprises a device identity and/or a group identity of the first MTC device;
   sending a location update message to a home subscriber register, wherein the location update message comprises the device identity and/or the group identity of the first MTC device;
   receiving group subscription data, of a group to which the first MTC device belongs, returned by the home subscriber register, wherein the group subscription data is group subscription data after the home subscriber register updates subscription data of all devices in a group corresponding to the group identity of the first MTC device, and the group subscription data comprises the group identity and/or a device identity list of all the devices in the group; and
   after the receiving the group subscription data,
      receiving a location management request initiated by a second MTC device, wherein the location management request carries a device identity of the second MTC device and a group identity of a group to which second MTC device belongs, and, if the group identity of the group to which second MTC device belongs is consistent with the group identity of the group to which the first MTC device belongs, returning a receiving response of the location management request to the second MTC device; or
      receiving a location management request initiated by a second MTC device, wherein the location management request comprises a device identity of the second MTC device, and, if the device identity of the second MTC device exists in the device identity list, returning the receiving response of the location management request to the second MTC device.

6. The method according to claim 5, wherein the location management request carries a device identity of the second MTC device and a group identity of a group to which second MTC device belongs, and wherein the method comprises returning the receiving response of the location management request to the second MTC device when the group identity of the group to which second MTC device belongs is consistent with the group identity of the group to which the first MTC device belongs.

7. The method according to claim 5, wherein the first MTC device is a master device of the group to which the first MTC device belongs, the master device is configured to initiate the location management request of the group to which the first MTC device belongs, and one or more other devices in the group to which the first MTC device belongs initiate no location management request.

8. The method according to claim 5, wherein before the sending the location update message to the home subscriber register, the method further comprises: acquiring the group identity from interaction signaling of a first mobility management network element originally corresponding to the first MTC device.

9. The method according to claim 8, wherein if a bearer connection is created between the first MTC device and the first mobility management network element, before the sending the location update message to the home subscriber register, the method further comprises:
sending a context request to the first mobility management network element, wherein the context request carries the group identity, so as to acquire a context, of all devices in the group to which the first MTC device belongs, saved in the first mobility management network element.

10. The method according to claim 9, wherein after the sending the context request to the first mobility management network element, the method further comprises:
sending an update bearer request to a first gateway, wherein the update bearer request carries the context of all the devices in the group to which the first MTC device belongs, so that a session connection is created between the first gateway and all the devices in the group to which the first MTC device belongs.

11. The method according to claim 10, wherein if the first MTC device is changed from a connection with the first gateway to a connection with a second gateway, before the sending the location update message to the home subscriber register, the method further comprises:
sending a delete bearer request to the first gateway, wherein the delete bearer request carries the group identity, so that the first gateway releases a session connection with all the devices in the group to which the first MTC device belongs; and
sending a create bearer request to the second gateway, wherein the create bearer request carries the group identity, so that a session connection is created between the second gateway and all the devices in the group to which the first MTC device belongs.

12. The method according to claim 5, wherein the location management request comprises a device identity of the second MTC device, and wherein the method further comprises returning the receiving response of the location management request to the second MTC device when the device identity of the second MTC device exists in the device identity list.

13. A mobility management network element comprising a processor and a non-transitory computer-readable medium storing program modules executable by the processor, the modules including:
a first receiving module configured to receive a location management request initiated by a first MTC device, wherein the location management request comprises a device identity and/or a group identity of the first MTC device;
an acquisition module configured to acquire the group identity from interaction signaling of a first mobility management network element originally corresponding to the first MTC device;
a sending module configured to send a location update message to a home subscriber register, wherein the location update message comprises the device identity and/or the group identity of the first MTC device; and
a second receiving module configured to receive group subscription data, of a group to which the first MTC device belongs, returned by the home subscriber register, wherein the group subscription data is group subscription data after the home subscriber register updates subscription data of all devices in a group corresponding to the group identity of the first MTC device, and the group subscription data comprises the group identity and/or a device identity list of all the devices in the group;
wherein the modules further comprise at least one of the following modules:
a first request processing module configured to, when the first receiving module receives a location management request that is initiated by a second MTC device and comprises a device identity of the second MTC device and a group identity of a group to which second MTC device belongs, if the group identity of the group to which second MTC device belongs is consistent with the group identity of the group to which the first MTC device belongs, return a receiving response of the location management request to the second MTC device; and
a second request processing module configured to, when the first receiving module receives the location management request that is initiated by the second MTC device and comprises the device identity of the second MTC device, if the device identity of the second MTC device exists in the device identity list, return the receiving response of the location management request to the second MTC device.

14. The mobility management network element according to claim 13, wherein the sending module at least comprises at least one of the following sub-modules:
a first sending sub-module configured to, when a bearer connection is created between the first MTC device and the first mobility management network element, send a context request to the first mobility management network element, wherein the context request carries the group identity, so as to acquire a context, of all devices in the group to which the first MTC device belongs, saved in the first mobility management network element;
a second sending sub-module configured to send an update bearer request to a first gateway, wherein the update bearer request carries the context of all the devices in the group to which the first MTC device belongs, so that a session connection is created between the first gateway and all the devices in the group to which the first MTC device belongs; and
a third sending sub-module configured to, when the first MTC device is changed from a connection with the first gateway to a connection with a second gateway, send a delete bearer request to the first gateway, where the delete bearer request carries the group identity, so that the first gateway releases the session connection with all the devices in the group to which the first MTC device belongs; and send a create bearer request to the second gateway, wherein the create bearer request carries the group identity, so that a session connection is created between the second gateway and all the devices in the group to which the first MTC device belongs.

* * * * *